Inventor
ADOLPH RONNING

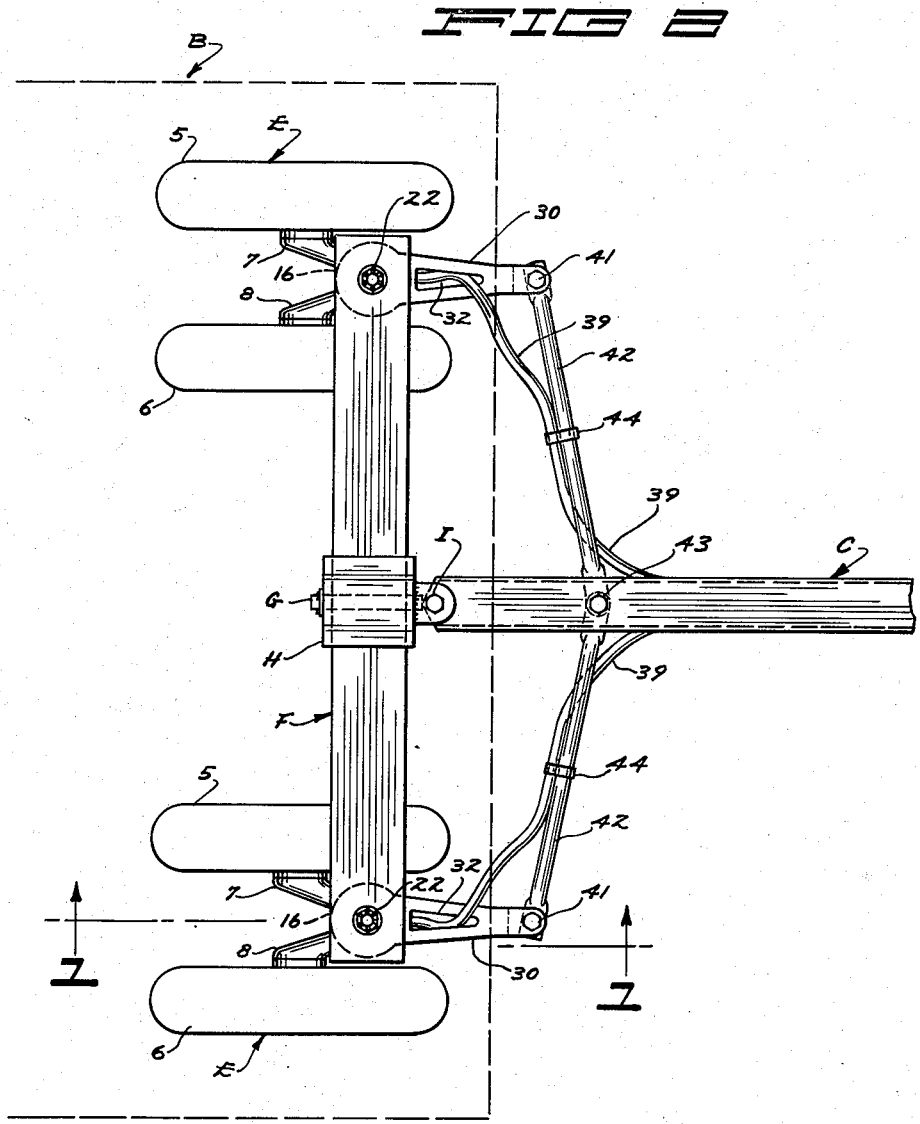

Aug. 25, 1953  A. RONNING  2,650,100
STEERABLE TRAILER FRONT WHEEL MECHANISM
Filed May 10, 1948  3 Sheets-Sheet 3
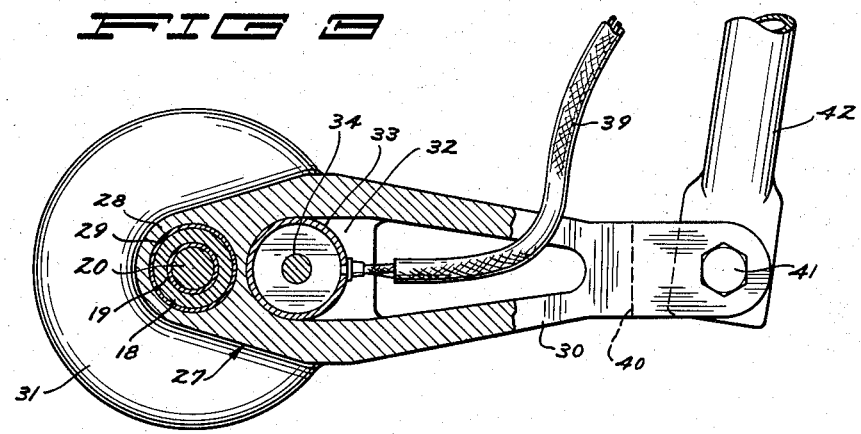
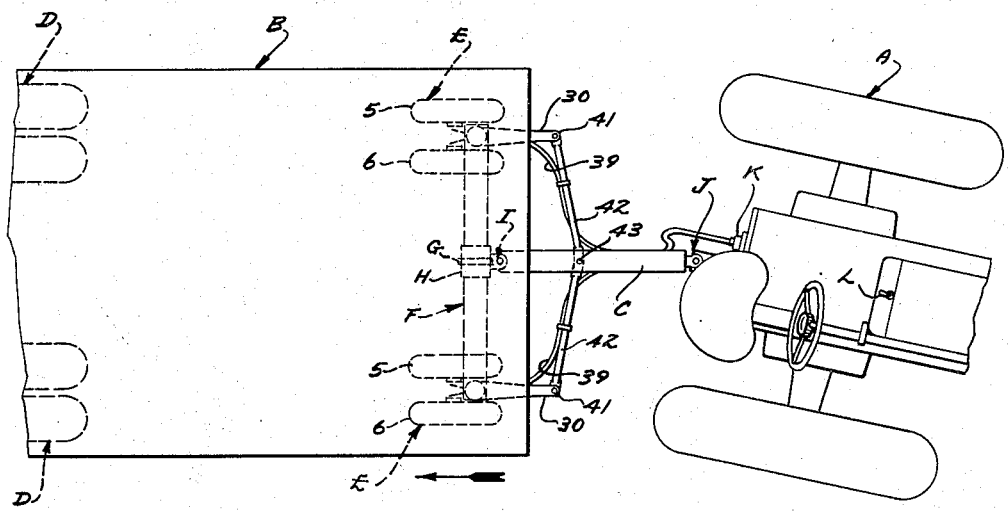
Inventor
ADOLPH RONNING
By Carlsen & Hagle
ATTORNEYS Patented Aug. 25, 1953

2,650,100

UNITED STATES PATENT OFFICE 2,650,100

STEERABLE TRAILER FRONT WHEEL MECHANISM

Adolph Ronning, Minneapolis, Minn.

Application May 10, 1948, Serial No. 26,203

4 Claims. (Cl. 280—33.5)

This invention relates generally to improvements in steerable supports for the forward ends of trailers, wagons and like vehicles and more particularly to improvements in tongue steered, wide spread supports of this nature.

The primary object of my present invention is to provide a steerable supporting mechanism, with wide spread dual wheels and a swingable draft tongue operatively connected to steer the wheels while the vehicle is moving forwardly, but with means for locking the tongue in a straightaway position when the vehicle moves rearwardly. It is well known that steerable tongue and wheel arrangements are very difficult to maneuver when traveling rearwardly due to an aggravated jackknifing tendency but this is alleviated and the maneuvering of the vehicle made much more convenient and safe by the locking of the tongue as provided by my invention.

Another object is to provide mechanism of this kind in simple and practical form, readily applicable to trailer vehicles of many kinds and with provision for remote control from the tractor vehicle.

This application is a continuation-in-part as to certain subject matter from my prior application Serial No. 18,970 for Steerable Trailer Support, filed April 5, 1948, now Patent No. 2,605,114, issued July 29, 1952.

These and other more detailed and specific objects will be disclosed in the course of the following specification, reference being had to the accompanying drawings, in which—

Fig. 2 is a plan view, on a reduced scale, of the support of front running gear making up my invention, the outline of the trailer vehicle body being shown in dotted lines.

Fig. 3 is a detail sectional view along the line 3—3 in Fig. 1.

Fig. 4 is a plan view, also on a reduced scale, of a tractor-trailer vehicular combination, embodying my present invention, showing the same just as the steering tongue is locked and the vehicles started to the rear.

Figure 1:
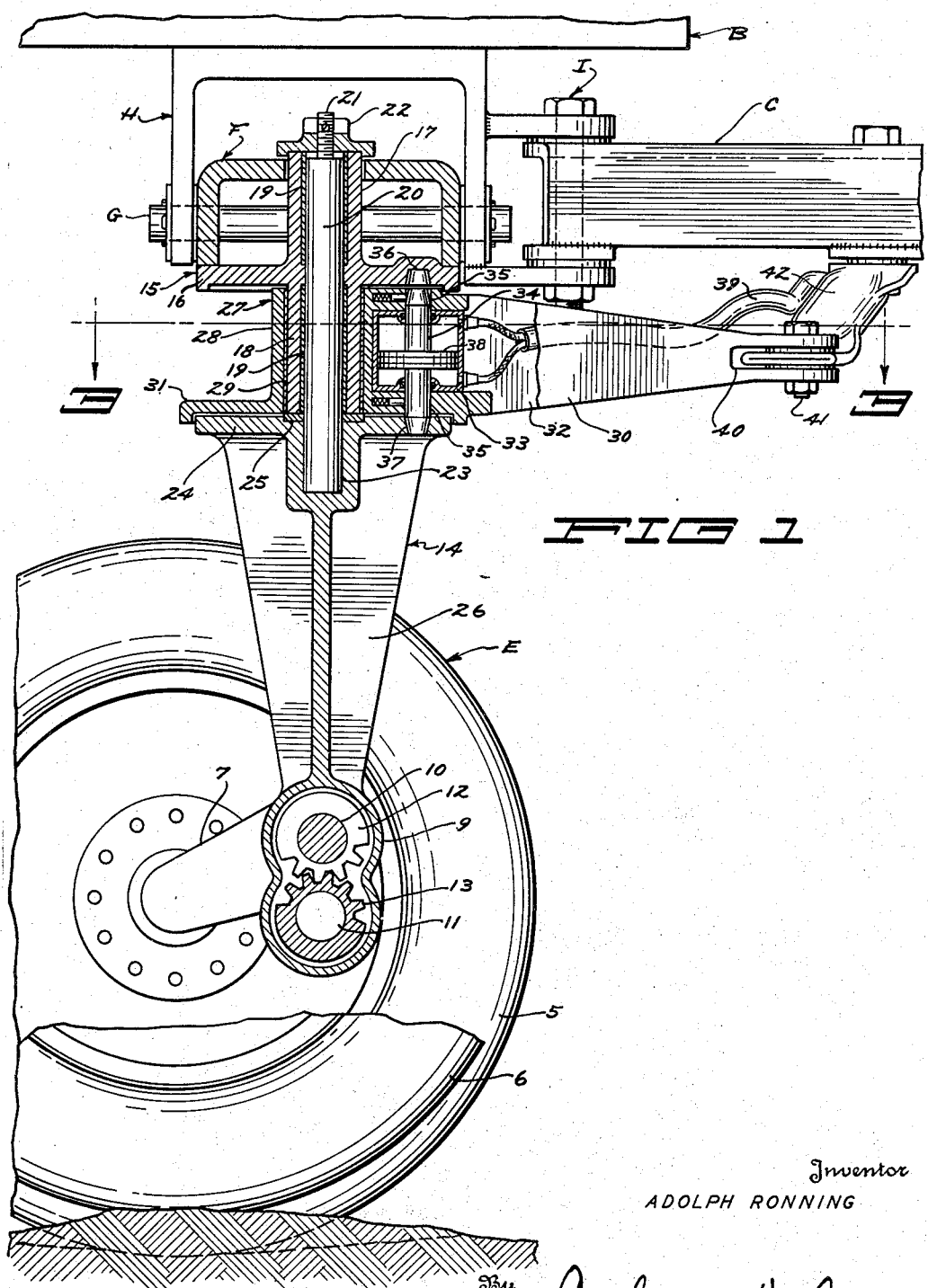
Fig. 1 is a vertical longitudinal sectional view through one steerable wheeled support of my invention, taken substantially along the line 1—1 in Fig. 2.

Referring now more particularly and by reference characters to the drawing, I have shown in Fig. 4 a vehicular combination of a tractor, designated generally at A, and a trailer, designated generally at B, having a draft tongue C by which it is pulled behind the tractor in the usual manner. The trailer B has the usual rear ground wheels D and the front end is supported upon a pair of wide spread steerable supports or wheel units, designated generally at E, which are mounted at the ends of the transverse oscillating axle member or bolster F pivotally mounted by a pin G to a bracket H secured beneath the front end of the tractor. The pin G extends in a fore and aft direction thereby permitting opposite up and down compensating motions of the ends of the axle member F and of the supports E mounted beneath these ends. The rear end of the draft tongue C is pivoted at I to a bracket affixed to the underside of the trailer so that the tongue may swing in lateral directions in a generally horizontal plane as the tractor A is steered to either side. The usual draft hitch J is provided between the front end of the tongue C and the draw bar of the tractor and is, of course, releasable to permit disconnection of the two units.

The steerable supports E are identical in construction and each comprises a closely spaced pair of differentially mounted wheels 5 and 6, which as best shown in Figs. 1 and 2, are journaled at the rear ends of crank arms or cranked axles 7 and 8, the forward journal ends of which are journaled transversely and in vertically spaced relation through a gear housing or case, indicated at 9. Within this gear housing the journaled ends of the axles 7 and 8, which are indicated respectively at 10 and 11, are provided with meshing gears 12 and 13 respectively so as to translate an upward swinging movement of the wheel supporting end of either axle into a corresponding and compensating downward movement of the other. Thus, it will be seen that the wheels will accommodate themselves to irregularities in the ground surface over which they travel as indicated in Fig. 1, and it may here be noted that this differential mounting is quite similar to that shown and claimed in my United States Patent No. 2,244,853, issued June 10, 1941.

For supportably connecting each pair of these compensating wheel structures to corresponding ends of the axle member F, I provide, for each, two main elements or parts which are respectively rotatable and non-rotatable about a vertical axis, and which are designated generally at 14 and 15. The non-rotatable or mounting element 15 includes a cap plate 16 having upwardly and downwardly extending bearing sleeves 17 and 18 and this element is welded or otherwise rigidly fastened to the axle member F, as best shown in Fig. 1, with the upper bearing sleeve 17 extending upwardly through the axle. Positioned within the bearing sleeves 17 and 18 are bushings 19 through which is rotatably mounted an upright king pin 20 and at its upper end the king pin has a reduced threaded extension 21 on which is screwed and rigidly fastened a cap nut 22 loosely and rotatably engaging the upper end of the sleeve 17. At its lower end the king pin 20 depends well below the lower bearing sleeve 18 and the pin is pressed or otherwise non-rotatably fitted into a socket 23 formed for its reception in the upper end of a rotatable element 14. Said element 14 has an upper bearing plate or flange 24 in which is fitted, around the king pin, a thrust bearing 25 adapted to bear upwardly against the lower end of the lower bearing sleeve 18 and transmit the load between the trailer and the wheels. A downward, suitably ribbed extension 26 connects the bearing plate 24 with the aforesaid gear housing 9 as clearly shown. The arrangement is thus obviously such that the element 14 directly supported by the wheels may turn about an upright steering axis provided by the king pin 20 to permit steering movements of the wheels, and it will further be noted that due to the offset of the crank axles 7 and 8 the wheels will have a tendency to caster about the axis of the pin.

Also forming part of the assembly is a steering element designated generally at 27 which includes locking means for selectively connecting it to the elements 14 and 15 and this element 27 has at its rear end a collar portion 28 which is journaled on a bushing 29 positioned around the depending lower bearing sleeve 18. Thus the steering element 27 may turn about the upright axis of the pin 20 between the cap plate 16 of the non-rotatable element 15 and the upper bearing plate 24 of the rotatable element 14. The steering element 27 further includes a forwardly extending arm 30 which projects forward some distance from the axle F from between the aforesaid cap plate 16 and bearing plate 24. A skirted flange 31 is also formed on the rear part of the steering element 27 and overlies the bearing plate 24 to prevent dust from entering the bearing assembly.

Located forwardly of the bearing assembly there is a cavity indicated at 32 in Fig. 3 wherein is positioned a locking device comprising a cylinder 33 in which a locking pin 34 is vertically and slidably mounted. The upper and lower ends of the pin 34 are tapered and project slidably through openings 35 registered with the ends of the cylinder 33 and adapted also to register with upper and lower locking recesses 36 and 37, formed respectively in the cap plate 16 and bearing plate 24. These recesses 36 and 37 are so located as to stand in vertical alignment when the wheels 5 and 6 are positioned for straightaway travel of the trailer and it will be obvious that when the locking pin 34 is moved upwardly into the recess 36 the steering arm 30 will be locked against lateral swinging movements about the axis of the king pin while the rotatable element 14 is permitted to turn about this axis. On the other hand, when the locking pin 35 is moved downwardly into the lower recess 37, as it is shown in Fig. 1, the steering arm 30 will be locked to the rotatable element 14 so that these parts must swing together about the steering axis. For thus oppositely moving the locking pin 34, it is provided inside the cylinder with a piston 38 and fluid or air under pressure may be admitted selectively to either upper or lower ends of the cylinder through a conduit 39 leading forwardly out of the cavities 32 in the steering arms and then extending forwardly through or alongside the draft tongue C to a connection K to the tractor. This connection K is of the releasable type and leads to a conventional source of pressure fluid on the tractor (not shown) and under control of a valve L the tractor operator may direct this fluid to either upper or lower ends of the cylinders to properly operate the lock pins, as will be understood.

Preferably the upper locking recess 36 of each wheel unit is so located that when the arm 30 of the unit is locked to the non-rotatable element 15 the arm will extend straightforwardly as shown in Fig. 2. The forward ends of the arms are forked, as indicated at 40, and pivotally connected by bolts 41 to these forked ends are the outer ends of radius members or steering rods 42. The inner ends of the steering rods 42 are then pivoted at 43 to the draft tongue C forwardly of its pivot I as clearly shown in Figs. 1 and 2. Clamps 44 connect the conduits 39 to the steering rods to keep them out of the way.

It will now be readily understood that when the locking pins 34 of the respective wheel units E are engaged with the lower recesses 37 the arms 30 will be connected through the rotatable elements 14 with the wheels 5 and 6 of each unit. Thus, as the tractor swings to either side when traveling around the corner, the draft tongue C will be correspondingly swung and this motion will be transmitted through the steering rods 42 to the arms 30 to correspondingly and properly steer the front wheels of the trailer. This will, of course, be the normal condition of the parts but when it is desired to move the vehicles rearwardly, the operator by actuation of the valve L, may direct the fluid to the locking mechanisms so as to project the locking pins 34 upwardly and engage them with the upper locking recesses 36. Thus, the steering arms 30 will be locked to the non-rotatable element 15 and to the axle F so that they cannot longer swing to either side and through the steering rods 42 draft tongue C will be correspondingly locked. Due to the location of the locking recesses 36 this locking effect will come into being only when the draft tongue C is positioned for straightaway travel and if by any chance the locking pins 34 are moved upwardly with the parts not in this position, it will, of course, be understood that as soon as the tongue straightens out the pins will snap into place to properly locate all of the elements in the desired positions. With the draft tongue C thus locked in a straightaway position the very annoying jackknifing tendency of the vehicles will be largely eliminated and it will be found that the trailer may be maneuvered and parked without difficulty. Obviously, when the locking pins 34 are released from the lower recesses 37 the wheel units are left free to caster as necessary for proper tracking of the vehicles.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In a trailer-type vehicle support of the character described, the combination comprising a pair of transversely spaced front supports for the vehicle each having a pair of oppositely upwardly and downwardly movable differentially connected wheels, means mounting the supports for steering movements, connecting means extending between the supports and operative to steer the same, a draft tongue mounted for swinging movement and connected to said connecting means for steering the supports, and means for selectively disengaging the steering connecting means and tongue from the supports and locking the tongue in a straight forwardly extending position.

2. In a trailer-type vehicle support of the character described, the combination comprising a pair of transversely spaced front supports for the vehicle each having a pair of oppositely upwardly and downwardly movable differentially connected wheels, a transversely extending axle member pivoted intermediate its ends beneath the vehicle for opposite up and down movements at its ends, means mounting the supports to the respective ends of the axle member and permitting steering movement of the supports, steering arms connected to the supports, a draft tongue pivoted at its rear end to the vehicle for lateral swinging movements, steering connections between the steering arms and the tongue, and means for disconnecting the steering arms from the supports and locking the tongue in a straight forwardly extending position.

3. Steerable supporting gear for the front end of a trailer-type vehicle, comprising a transverse axle member intermediately pivoted to the vehicle for up and down swinging movements, a casterable and steerable wheeled support at each end of the axle, a draft tongue pivoted to the vehicle for lateral swinging movements, steering arms pivoted to the wheel supports and linked to the tongue for swinging movements thereby, and means normally connecting the arms to the supports for steering the latter as the arms swing but disconnectible therefrom to free the wheels for caster movements as the vehicle is backed.

4. Steerable supporting gear for the front end of a trailer-type vehicle, comprising a transverse axle member intermediately pivoted to the vehicle for up and down swinging movements, a casterable and steerable wheeled support at each end of the axle, a draft tongue pivoted to the vehicle for lateral swinging movements, steering arms pivoted to the wheel supports and linked to the tongue for swinging movements thereby, and means normally connecting the arms to the supports for steering the latter as the arms swing but disconnectible therefrom and connectible instead to the vehicle for freeing the wheels for caster movements and locking the steering arms and tongue against swinging movements as the trailer is backed.

ADOLPH RONNING.

References Cited in the file of this patent

UNITED STATES PATENTS

| Number | Name | Date |
|---|---|---|
| 1,221,608 | Schroeder | Apr. 3, 1917 |
| 1,510,543 | Cadman | Oct. 7, 1924 |
| 1,566,617 | Reid | Dec. 22, 1925 |
| 2,107,384 | McQueen | Feb. 8, 1938 |
| 2,208,601 | Ronning | July 23, 1940 |
| 2,339,582 | Peterson | Jan. 18, 1944 |
| 2,383,216 | Runyon | Aug. 21, 1945 |